United States Patent
Frenger et al.

(10) Patent No.: US 10,728,766 B2
(45) Date of Patent: Jul. 28, 2020

(54) METHOD AND NETWORK NODE FOR MANAGING A GEO-FENCE FOR USE BY A SOURCE RADIO NETWORK NODE

(71) Applicant: TELEFONAKTIEBOLAGET LM ERICSSON (PUBL), Stockholm (SE)

(72) Inventors: Pål Frenger, Linköping (SE); Erik Eriksson, Linköping (SE); Martin Hessler, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/738,978

(22) PCT Filed: Jun. 24, 2015

(86) PCT No.: PCT/SE2015/050735
§ 371 (c)(1),
(2) Date: Dec. 21, 2017

(87) PCT Pub. No.: WO2016/209128
PCT Pub. Date: Dec. 29, 2016

(65) Prior Publication Data
US 2018/0184304 A1    Jun. 28, 2018

(51) Int. Cl.
*H04W 40/00* (2009.01)
*H04W 16/18* (2009.01)
(Continued)

(52) U.S. Cl.
CPC ........... *H04W 16/18* (2013.01); *H04W 24/10* (2013.01); *H04W 36/32* (2013.01); *H04W 36/245* (2013.01); *H04W 36/30* (2013.01)

(58) Field of Classification Search
CPC combination set(s) only.
See application file for complete search history.

(56) References Cited

U.S. PATENT DOCUMENTS 5,432,842 A    7/1995   Kinoshita et al.
6,631,263 B1 * 10/2003  Corkery ................ H04W 16/18
                                                    455/436
(Continued)

FOREIGN PATENT DOCUMENTS

CN    102056292 A    5/2011
CN    103096403 A    5/2013
(Continued)

OTHER PUBLICATIONS

European Communication dated Apr. 9, 2018, issued in European Patent Application No. 15896482.5, 4 pages.
(Continued)

*Primary Examiner* — Justin Y Lee
(74) *Attorney, Agent, or Firm* — Sage Patent Group

(57) ABSTRACT

A method and a network node (130) for managing a geo-fence for use by a source radio network node (120) are disclosed. The network node (130) receives (A010) indications about signal quality at respective positions of user equipments (110), wherein the user equipments (110) have been subject to hand-overs from the source radio network node (120) at the respective positions, wherein the hand-overs are based on signal quality measured for the user equipments (110). The network node (130) defines (A040) the geo-fence based on the respective positions and the indications about signal quality, wherein the geo-fence defines a geographical area. The network node (130) supports (A050) a hand-over of a user equipment (110) from the source radio network node (120) to a target radio network node (121) while using the geo-fence, wherein the hand-over is performed without measurements, by the user equipment (110), of signal quality towards the target radio network node (121) for the user equipment (110). Moreover, a computer program and carrier therefor are also disclosed.

16 Claims, 3 Drawing Sheets

(51) Int. Cl.
*H04W 36/32* (2009.01)
*H04W 24/10* (2009.01)
H04W 36/30 (2009.01)
H04W 36/24 (2009.01)

(56) References Cited

U.S. PATENT DOCUMENTS

| | | |
|---|---|---|
| 8,781,475 B1 | 7/2014 | McKeeman et al. |
| 2011/0195701 A1* | 8/2011 | Cook .................. G01S 5/0018 |
| | | 455/422.1 |
| 2014/0064247 A1 | 3/2014 | Teyeb et al. |
| 2014/0141784 A1 | 5/2014 | Schmidt et al. |

FOREIGN PATENT DOCUMENTS

| | | |
|---|---|---|
| CN | 104219718 A | 12/2014 |
| EP | 1081974 A2 | 3/2001 |
| WO | 0028768 A1 | 5/2000 |
| WO | 2013048331 A1 | 4/2013 |

OTHER PUBLICATIONS

International Search Report and Written Opinion issued in Application No. PCT/SE2015/050735 dated Feb. 16, 2016, 12 pages.
First Chinese Office Action for Chinese Patent Application No. 201580081218.7 dated May 6,2020, 10 pages (including English translation).

* cited by examiner

US 10,728,766 B2

METHOD AND NETWORK NODE FOR MANAGING A GEO-FENCE FOR USE BY A SOURCE RADIO NETWORK NODE

CROSS REFERENCE TO RELATED APPLICATION(S)

This application is a 35 U.S.C. § 371 National Stage of International Patent Application No. PCT/SE2015/050735, filed Jun. 24, 2015, designating the United States, the disclosure of which is incorporated by reference.

TECHNICAL FIELD

Embodiments herein relate to wireless communication systems, such as radio communication systems. In particular, a method and a network node for managing a geo-fence for use by a source radio network node are disclosed. A corresponding computer program and a carrier therefor are also disclosed.

BACKGROUND

Within wireless communication, efforts in improving existing systems are currently focused on specifying the so called $5^{th}$ generation (5G) system architecture.

Disadvantages of existing systems, such as Long Term Evolution (LTE), Universal Mobile Telecommunications System (UMTS), Global System for mobile communications (GSM) and the like, include insufficiently efficient power consumption, insufficient capability of handling massive amounts of terminals, and insufficient data rates and coverage in various scenarios.

In an exemplifying scenario, a first radio network node is capable of beam-forming and broadcasts reference signals in a cell representing a coverage area of the first radio network node. A second network node, neighboring to the first radio network node, is also capable of beam-forming and does also broadcast reference signals in a cell representing a coverage area of the second radio network node. In order to reduce power consumption, the first and second radio network nodes may be configured to only sparsely transmit the reference signals, and when possible may be configured to transmit control information using beam-forming. In this scenario, a problem may be how to manage mobility of a user equipment, served by the first radio network node, due to missing reference signals from the second radio network node, which in particular occurs when the second radio network node attempts to save power.

To overcome this problem, it has been proposed to turn on the reference signals for the second radio network node when the user equipment is detected to be located at outskirts of a coverage area for the first radio network node. Then, the user equipment measures the signal quality for the second radio network node. Subsequently, the handover may be performed if the measurement of signal quality is above a threshold value for triggering handover. A disadvantage is that the reference signals consume power.

SUMMARY

An object may be to overcome, or at least mitigate, the above mentioned problem.

According to an aspect, the object is achieved by a method performed by a network node for managing a geo-fence for use by a source radio network node. The network node receives indications about signal quality at respective positions of user equipments, wherein the user equipments have been subject to hand-overs from the source radio network node at the respective positions, wherein the hand-overs are based on signal quality measured for the user equipments. The network node defines the geo-fence based on the respective positions and the indications about signal quality, wherein the geo-fence defines a geographical area. The network node supports a hand-over of a user equipment from the source radio network node to a target radio network node while using the geo-fence, wherein the hand-over is performed without measurements, by the user equipment, of signal quality towards the target radio network node for the user equipment.

According to another aspect, the object is achieved by a network node configured for managing a geo-fence for use by a source radio network node. The network node is configured for receiving indications about signal quality at respective positions of user equipments, wherein the user equipments have been subject to hand-overs from the source radio network node at the respective positions, wherein the hand-overs are based on signal quality measured for the user equipments. Moreover, the network node is configured for defining the geo-fence based on the respective positions and the indications about signal quality, wherein the geo-fence defines a geographical area. Furthermore, the network node is configured for supporting a hand-over of a user equipment from the source radio network node to a target radio network node while using the geo-fence, wherein the hand-over is performed without measurements, by the user equipment, of signal quality towards the target radio network node for the user equipment.

According to further aspects, the object is achieved by computer programs and carriers therefor corresponding to the aspects above.

The hand-over is supported by use of the geo-fence, e.g. the source radio network node determines that the user equipment should be handed-over to the target radio network node when the user equipment moves outside the geographical area defined by the geo-fence. Then, the hand-over may be performed without the user equipment performing measurements of signal quality towards the target radio network node. In this manner, the user equipment is not required to perform measurements on neighboring radio network nodes. As a result, the user equipment may have a low manufacturing cost or the user equipment may save power by not being required to perform measurements.

An advantage is that mobility of low-cost user equipments or power saving user equipments is enabled.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
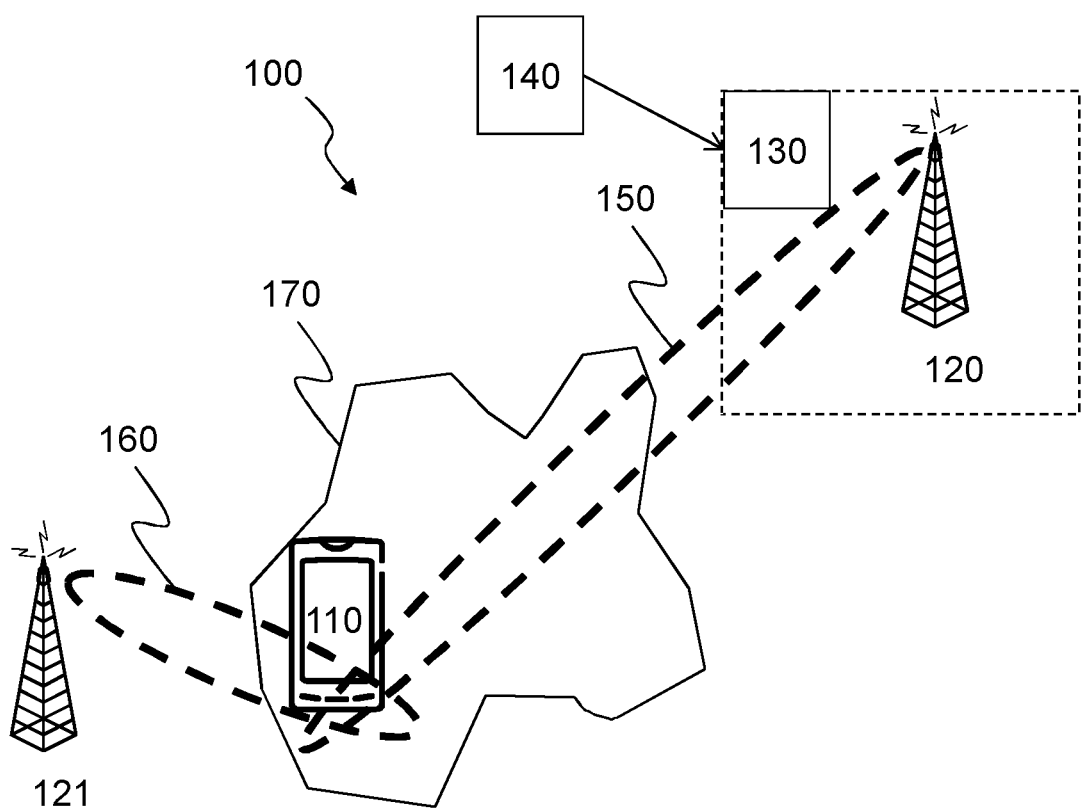
FIG. 1 is a schematic overview of an exemplifying network in which embodiments herein may be implemented.

A design principle currently under consideration for 5G is to base it on an ultra-lean design. This implies that so called "always on signals", such as reference signals, pilot signal, sounding reference signals and the like, from the network should be avoided as much as possible. An expected benefit from the design principle is that a significantly lower network energy consumption, better scalability, higher degree of forward compatibility during the Radio Access Technology (RAT) evolution phase, lower interference from system overhead signals and consequently higher throughput in low load scenario, and improved support for user centric beam-forming, are achieved.

With the 5G system architecture, beam-forming is expected to be heavily, or even massively, used. One enabler for massive beam-forming is Advanced Antenna systems (AAS), which technology has advanced significantly in recent years and also is foreseen to have a rapid technology development in the years to come. Hence, it is natural to assume that the AAS in general and advanced Multiple Input Multiple Output (MIMO) transmission and reception in particular will be a cornerstone in a future 5G system. The beam forming capability could be used to create either fixed beams or flexible beams.

Beam-forming is becoming increasingly popular and capable, and therefore it may be considered for transmission of not only data, but also of control information. This is one motivation behind the introduction of a (relatively) new control channel in LTE known as enhanced Physical Downlink Control CHannel (ePDCCH). When beam forming is used for transmission of control information, cost in terms of bits of transmitting the control information may be reduced due to increased antenna gain.

In order to better appreciate the embodiments herein, the following observations are made.

In a wireless access system that does not have frequent 'always-on' signals to measure on, it becomes difficult to identify the boundary at which a handover of a user equipment needs to be performed to either a neighboring beam in the same node or to a beam in a neighboring node.

Moreover, there is no assumption, at the user equipment, on a one-to-one mapping between the random access based initial attachment to a radio network node at a location and a coverage area of beams from the radio network node. A reason for this is that a coverage area achieved with beam-forming may largely supersede a coverage area given by random access based initial attachment, i.e. where random access is expected to be successful.

Furthermore, also in case of beam-forming, in particular when using flexible beams, there needs to be a way to confine the coverage area of the flexible beams to a certain geographical area. A reason for this may be that a specific service should only be available within the certain geographical area, such as a concert hall, a sports stadium and the like. If a user equipment wishes to move out of the certain geographical area, then a hand-over could, or even should, be triggered, and/or a radio base station, whose coverage is adjacent, or over-lapping, to the certain geographical areas, may be pre-informed based on identifying that the user equipment is about to leave, or has left, the certain geographical area.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying network 100 in which embodiments herein may be implemented. In this example, the network 100 is characterized by that it is configured with very few "always-on" signals, e.g. according to the ultra-lean design principle, and that that it utilizes beam-forming, e.g. so called massive beam-forming. As an example of very few "always-on" signals, it can be mentioned that overhead, i.e. control transmission, shall be small in relation to data transmission for a node also in a low load scenario. When there is data transmission during 5-10% of a time span, it may be considered to be a low load scenario. Then, in order to fulfill the ultra-lean design principle, it may be that control transmission should be less than 1% of the time for the data transmission during the time span.

In other examples, the network 100 may be any cellular or wireless communication system, such as a LTE, UMTS and Worldwide Interoperability for Microwave Access (Wi-MAX) allowing a layer of D2D communications or the like, a GSM network or evolutions thereof.

FIG. 1 depicts a user equipment 110 that is located in the vicinity of a source radio network node 120. The user equipment 110 may be served by the source radio network node 120.

Furthermore, a target radio network node 121 is shown in FIG. 1. The network 100 may comprise the target radio network node 121 as well as the source radio network node 120.

In embodiments where the network 100 is configured based on ultra-lean design, the target and source radio network nodes 120, 121 do not transmit any 'always-on' signals, i.e. cell specific always-on signals for mobility, and user equipments are served only by beams of a beam based architecture applied in the network 100.

Moreover, a network node 130 is shown. The network node 130 may be separated from the source radio network node 120 or the network node 130 may comprise the source radio network node 120. As an example, the network node 130 may manage geo-fence(s) for one or more radio network nodes, such as the source radio network node 120, the target radio network node 121, and the like.

Additionally, the network 100 may comprise a core network node 140. The core network node 140 may be configured for handling of operations and maintenance, e.g. the core network node 140 may be an Operations And Maintenance (OAM) node.

The source radio network node 120 may communicate 150 with the user equipment 110, e.g. using beam-forming. This communication may include user transmissions and/or control transmissions, aka user plane and/or control plane. The user transmissions may include user data, payload data, content data etc. The control transmissions may include control information relating to e.g. scheduling, authentication, mobility etc. The communication may include uplink transmission and/or downlink transmission. When the user equipment 110 has been handed-over to the target radio network node 121, the target radio network node may communicate 160 with the user equipment 110, e.g. using beam-forming. This communication may include user transmissions and/or control transmissions, as defined above.

Furthermore, a geo-fence 170 associated with the source radio network node 120 is illustrated. The geo-fence 170 defines a region that may be similar to the coverage area of a cell in LTE. In LTE, there are 'always-on' cell specific signals like Primary Synchronization Signal (PSS)/Secondary Synchronization Signal (SSS) which may be used to determine the coverage area of a cell. But in case of an ultra-lean system with limited, sporadic, non-node specific always-on signals, it is not straight forward to obtain a coverage area of a radio network node.

The geo-fence 170 for the source radio network node 120 may provide additional information on the coverage area of the source radio network node 120. The geo-fence 170 may be created, e.g. in an ultra-lean network 100 without 'always-on' signaling from radio network nodes of the network 100. Also note that, the geo-fence 170 in itself does not involve any 'always-on' signal in the air from the radio network nodes but is a created by the radio network nodes, or other network nodes, either based on reporting from the UEs or with the aid of the core network node 140. The geo-fence 170 may be described as a a handover fence, a handover border, a virtual fence, a handover mapping region.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point, or evolutions thereof, e.g. for a 5G network as above, or the like.

As used herein, the term "user equipment" may refer to a wireless device, a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

As used herein, the term "active mode mobility" refers to when the user equipment 110 moves around in the network 100 and is served by different radio network nodes. Being in "active mode" means that the user equipment 110 may be engaged in a data transfer, a phone call, or the like, i.e. the user equipment 110 is in RRC_CONNECTED mode in case of LTE.

Figure 2:
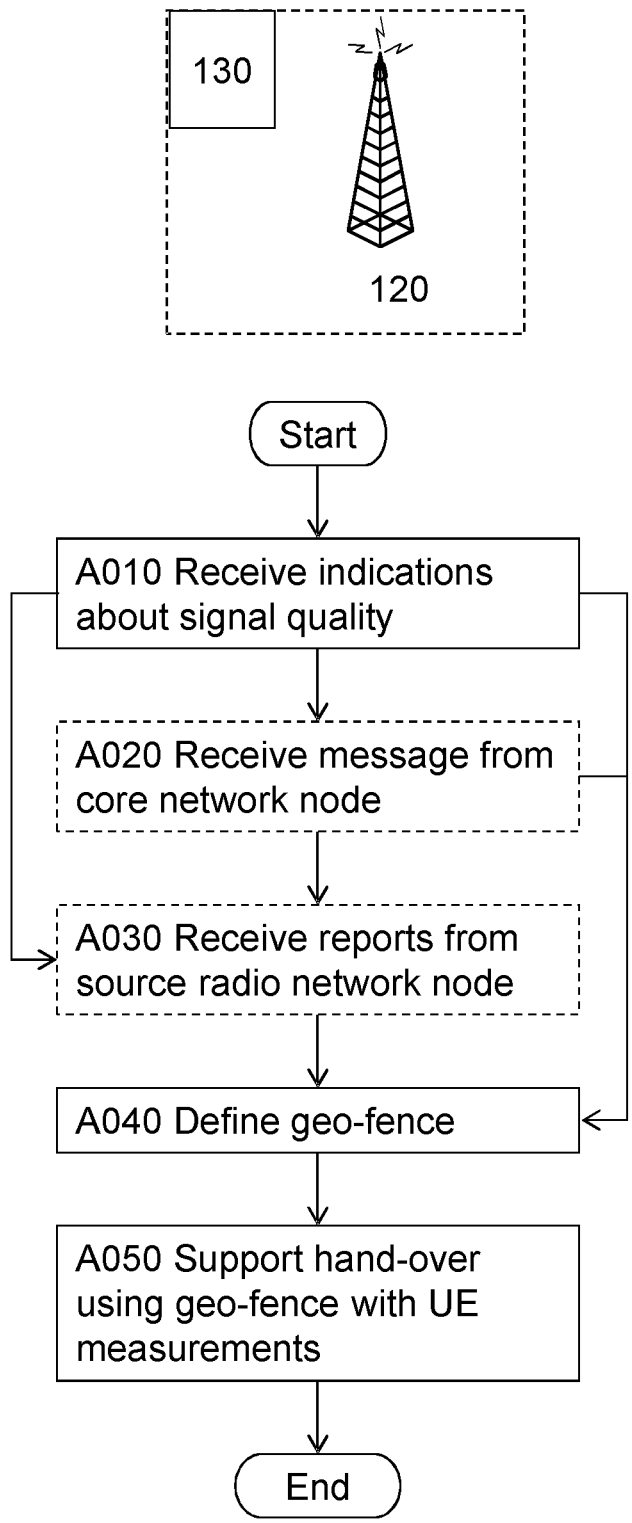
FIG. 2 is a flowchart illustrating embodiments of a method in a network node.

FIG. 2 illustrates an exemplifying method according to embodiments herein when implemented e.g. in the network 100 of FIG. 1.

The network node 130 performs a method for managing a geo-fence for use by a source radio network node 120.

As mentioned, the network node 130 may comprise the source radio network node 120. This means that the method of FIG. 2 may in some examples be performed by the source radio network node 120.

One or more of the following actions may be performed in any suitable order.

Action A010

The network node 130 receives indications about signal quality at respective positions of user equipments 110, wherein the user equipments 110 have been subject to hand-overs from the source radio network node 120 at the respective positions, wherein the hand-overs are based on signal quality measured for the user equipments 110. The signal quality may have been measured by the user equipments or the source radio network node 120.

The indications may be received from the source radio network node 120, the user equipments 110 or a core network node 140.

The indications may be received from the source radio network node 120, i.e. when the network node 130 is separated from the source radio network node 120, when the indications include reports of UL/DL measurements of signal quality.

The indications may be received from the user equipment 110 when it is the source radio network node 120 that performs action A010.

In this action, the network node 130 may collect statistics about signal quality, in terms of e.g. Signal-to-Noise-and-Interference-ratio (SINR), Channel Quality Indicator, Channel State Information, path loss, Received Signal Strength Indicator (RSSI), Reference Signal Received Quality (RSRQ), etc.

The respective positions of the user equipments 110 may be expressed as geographical coordinates, channel quality finger prints or a combination thereof. A channel quality finger print may be defined by one or more of: timing alignment, angle of arrival, antenna pre-coder parameters, etc.

Action A020

In some examples, the network node 130 may receive a message relating to the indications from the core network node 140 for handling of Operations And Maintenance (OAM), such as an OAM node. The indications, which relate to signal quality, may then be obtained from drive-test measurements or the like. For example, the indications may include geographical coordinates of a coverage area as measured during the drive-test measurements. The coverage area is associated with hand-over. In action A040, the network node 130 may use the geographical coordinates when defining the geo-fence.

This means that the geo-fence is preconfigured, i.e. defined before the network 100 is put is use, based on information, such as the message above, from the core network node 140. In this case, the geo-fence is based on the drive test measurements or any other available pre-knowledge.

Expressed differently, the receiving in action A010 of indications about signal quality may comprise receiving A020, from the core network node for handling of operations and maintenance, the message relating to the indications. Again, the indications may be obtained from drive-test measurements.

Action A030

In another example, in order to be able to perform action A040, the network node 130 may receive, from the source radio network node 120, a set of reports relating to the indications. The reports may be related to many different measurements, such as uplink measurements, downlink measurements or the like, collected by the user equipment 110, the source radio network node 120, the network node 130.

Expressed differently, the receiving in action A010 of indications about signal quality may comprise receiving A030, from the source radio network node 120, the set of reports relating to the indications.

Thus, the reports may be related to uplink transmission, i.e. the indications may relate to measurements of uplink transmission from the user equipments at the respective positions for the hand-overs.

A procedure for obtaining the reports of uplink transmission, or uplink measurements, may include:
1. Identify a location to trigger the measurement of an uplink transmission from a UE.

In order to trigger an uplink transmission from the user equipment, the source radio network node 120 may identify the location/position of the user equipments. The location may be identified based on one or more of:

A combination of Angle of Arrival (AoA) and Timing Advance (TA),

A geo-position of the UE, e.g. by using Global Positioning System (GPS),

Finger printing of the positioning related signaling,

A number of "good" beams. For example, if only one, or few, available beam(s) above a SINR threshold trigger the transmission from the user equipment.

2. Once a user equipment is identified as a candidate for UL transmission, then the source radio network node informs neighboring nodes, such as the target radio network node 121, about this particular user equipment and also requests the user equipment to transmit UL transmission, such as pilots or reference signals.

3. The uplink transmission from the user equipment 120 may be similar to Physical Random Access Channel (PRACH) transmission in order to establish a one-to-one relation between the results of random access procedure and the geo-fence results at that location.

4. Based on the received uplink measurements at different nodes, the network node 130 may evaluate the position of the geo-fence, for example as a part of action A040 below. This evaluation may consider the procedure used in random access procedure, node capabilities of the nodes that heard the UL signal etc.

Furthermore, the report may be related to downlink transmission, i.e. the indications may relate to measurements, performed by the user equipments 110, of downlink transmission from the source radio network node 120 at the respective positions for the hand-overs.

A procedure for obtaining the reports of downlink transmission, or downlink measurements, may be based on "always-on" signals in System Control Plane (SCP) or dedicated area-wide Mobility Reference Signal (MRS).

There are few signals in SCP that are 'always-on'. Though their purpose is to provide either positioning (PRS) or to provide basic idle mode mobility coverage (System Signature Sequence Index SSI, assuming that there is a way to identify node index), these signals may be used for the defining of the geo fence. Once the user equipment 110 is configured to measure on such signals, the reporting could be similar to the event triggered reporting in LTE, for example 'A events' or 'B events', which includes signal strength going above/below a threshold, relative signal strength being above/below a threshold etc. Based on the measurement reporting, in one embodiment, a geo-fence for the source radio node is established in action A040 below, where the measured signal strength from the source radio network node 120 is the strongest. The procedure may include the steps of:

1. Broadcast "always-on" signals at regular intervals.
2. Identify a location to trigger the measurement of uplink transmission the uplink, i.e. where an uplink transmission should be triggered, on which measurements may be performed by nodes.
3. Configure user equipment 110 to transmit event triggered reporting from the source and target radio network nodes 120, 121.
4. Define geo-fence, as in action A040 below, based on location/position of user equipment and the event trigged reports of signal quality of downlink transmission, such as "always-on" signals in SCP.

An alternative procedure for obtaining report of downlink transmission may be based on dedicated area-wide MRS A few limitations of re-using the 'always-on' signals, as in the procedure directly above, may be that they are built and designed for a different purpose, their transmission interval is typically too frequent to fulfill the ultra-lean design, and not all nodes need to transmit the SSI or PRS. In such a case, a dedicated signal that supports frequent transmission compared to SSI or PRS could be introduced to support the establishment of the geo-fence. Note that this signal needs be transmitted only if there is any user equipment present in an active mode, e.g. a phone call is on-going, a file is down/up-loaded, etc, and if there is a need to have the geo-fence related measurement.

The area-wide MRS could have similar properties in terms of coverage to that of PSS/SSS signals of LTE for a given cell. Ideally, the received strength of the area-wide MRS from a node needs to be the strongest in comparison with the neighboring cells at a location if a random access procedure initiated from that location results in connecting to the (said) node. The procedure may include the steps of:

1. Identify a location to trigger the measurement of uplink transmission the uplink, i.e. where an uplink transmission should be triggered, on which measurements may be performed by nodes.
2. Configure user equipment 110 to transmit event triggered reporting from the source and target radio network nodes 120, 121.
3. Request transmission of wide-area MRS.
4. Receive event triggered reporting based on downlink measurements on MRS by user equipment 110.
5. Stop area-wide MRS transmission
6. Define geo-fence, as in action A040 below, based on location/position of user equipment and the event trigged reports of signal quality of downlink transmission, such as MRS.

In these examples, the indications provide information about signal quality based on actual measurements, i.e. not drive-test measurements. Thus, in case signal quality has changed since the drive-test measurements, then the embodiments of action A030 will improve accuracy.

Action A040

The network node 130 defines the geo-fence based on the respective positions and the indications about signal quality, wherein the geo-fence defines a geographical area.

The geographical area may be defined in terms of geographical coordinates. However, the geographical area may also be defined in terms of the signal quality measurements for the handovers, which signal quality measurement may be mapped to a certain position. The signal quality measurements, sometimes be referred to as signal quality fingerprint, may include information about one or more of timing alignment and angle-of-arrival, antenna pre-coder parameters, etc.

As explained above, e.g. in one or more of actions A010, A020, A030 and A040, the geo-fence may be defined, or created, in various manners.

For example, the creation may be:

OAM based direct notification to the network node 130 in order to map positions in a coverage area to the geographical area defined by the geo-fence, as in action A020 above, based on UL transmission of a signal from the user equipment targeting the source radio network node 120 under evaluation and the reporting of the signal strength of the source radio network node 120, as in action A030, and/or based on DL transmission of area-wide MRS from the source radio network node 120 targeting the user equipment 110 and the reporting of the signal strength of the area-wide MRS from the user equipment 110.

In addition to that the geo-fence 170 is defined, the geo-fence 170 may be maintained, or updated, in order to provide an accurate description of positions at which hand-over, from the source radio network node 120, shall be triggered.

Hence, as an example, the source radio network node 120 may increase a counter every time the user equipment 110 returns to it after having been forced to move to the target radio network node 121, or another radio network node. Hence, when the user equipment 110 returns to the source radio network node 120 for the third time within a certain time period and at substantially the same position, the user equipment 110 may be allowed to stay in the source radio network node 120 even though the user equipment 110 is estimated to be located outside of the geo-fence of the source radio network node 120. Therefore, action A040 may be that the network node 130 updates the geo-fence such that the user equipment now is within the geo-fence. The updating of the geo-fence means that the geographical area is re-defined to include at least the position at which the user equipment 110 returned to the source radio network node 120 for the third time as mentioned above. In this manner, the geo-fence is adapted based on results of the hand-overs. In this case, the hand-overs are determined by the geo-fence, but in other examples the hand-over, based on which the geo-fence is adapted, may be determined by radio measurements.

Action A050

The network node 130 supports a hand-over of a user equipment from the source radio network node 120 to a target radio network node 121 while using the geo-fence, wherein the hand-over is performed without measurements, by the user equipment 110, of signal quality towards the target radio network node 121 for the user equipment 110. Accordingly, the hand-over is performed without requiring any measurements towards the target radio network node 121, where those non-performed measurements relate to signal quality. This means that the hand-over is performed without support from the user equipment 110 when it concerns measurements of signal quality.

The hand-over is different from the hand-overs, for which indications about signal quality are obtained, in action A010. The user equipment, however, may be one of the user equipments for which indications about signal quality are received by the network node 130 in action A010. Indeed, the user equipment may alternatively be different from these user equipments in action A010 for which indications are received by the network node 130.

In this manner, the source radio network node 120 is aided by the geo-fence when handling the user equipment 110 during active mode mobility.

An advantage is that the embodiments herein enables low cost UEs to be designed without any capabilities for performing mobility measurements, i.e. measurements on neighboring nodes etc., for supporting active mode mobility.

The embodiments herein may also be used as a fallback procedure to be invoked when active mode mobility procedures according to prior art are failing.

In some embodiments herein, the geo-fence is determined by the core network node 140, such as an OAM node, in a way the geo-fence essentially described the coverage area for the source radio network node 120. An advantage may then be that the geo-fence may limit the coverage area of the source radio network node 120 such that the user equipment 110 would have connected to the same node upon random access at initial access. In these embodiments, it is preferred that the source radio network node 120 is configured to transmit flexible beams. In this manner, a one-to-one mapping for selection of the source radio network node 120 upon random access and the triggering of hand-over as proposed herein may be achieved.

A few examples of use of the geo-fence are given here, albeit the use of the geo-fence for supporting hand-over in active mode mobility is already mentioned above.

As a first example, once the network node 130 has established the geo-fence information as in action A040, the network node 130 may use this information to notify the target radio network node 121 of a possible incoming user equipment 110. The network node 130 shall also have knowledge about a geo-fence of the target radio network node 121.

The source radio network node 120 that is serving the user equipment 110 may continue to serve the user equipment 110 in its beam even when the user equipment 110 travels outside the geo-fence 170 if the user equipment 110 is experiencing excellent signal quality.

Under such circumstances, the source radio network node 120 may pre-notify the target radio network node 121 about the presence of the user equipment 110 within the geo-fence (not shown) of the target radio network node 121 in order to initiate a re-attach procedure upon Radio Link Failure (RLF).

Moreover, the target radio network node 121 may pre-identify optimal beam for the user equipment 110 by listening to the uplink data from the user equipment 110. Additional assistance for improving uplink listening may be provided if the user equipment 110 is forced to do a simple PRACH like procedure in a few resources to help optimal beam finding in the target radio network node 121. This will help the target radio network node 121 to identify the optimal beam even before it has received the user equipment 110 from the source radio node 120 due to e.g. a hand-over.

Furthermore, the source radio network node 120 may pre-notify, i.e. before hand-over, the target radio network node 121 about the presence of the user equipment 110 in order to force a hand-over of the user equipment 110 from the source radio network node 120 to the target radio network node 121. As an example, when the target radio network node 121 identifies the presence of the user equipment 110, being served by the source radio network node 120, within its geo-fence (not shown in FIG. 1), the target radio network node 121 may force the source radio network node 120 to hand-over the user equipment 110 if the target radio network node 121 predicts a requirement of downlink transmission in the direction of the user equipment 110, where the predicted requirement of downlink transmission may be caused by a need to serve some other user equipments within its geo-fence.

In order to avoid problems with user equipments getting caught in a blank spot, i.e. at an area or location where no node considers them to be inside of their geo-fence some additional functionality can be used.

In an example, the network node 130 may run a timer whose duration before expiry is dependent on how close to a border of the geo-fence 170 the user equipment 110 is estimated to be located. Assuming that the user equipment 110 does not have any capabilities for active mode mobility measurements, it may be forced to attempt a handover to some other node once per hour when located far away from the border. Oppositely, when the user equipment 110 is located closer to the border, it may be forced to search for alternative serving nodes more often, e.g. every minute. If the user equipment 110 is e.g. periodically polled by the network node 130, or the source radio network node 120, the user equipment 110 may wake up only to receive the polling command and respond accordingly. In order to reduce battery consumption of the user equipment 110 or cost of the user equipment 110, it may not perform any active mobility measurements, but instead rely on that the source radio network node 120 informs the user equipment 110 on when it should start searching for another candidate node, i.e. by performing a new random access transmission.

In another example, if the user equipment 110 has capabilities for active mode mobility measurements it may then be allowed to stay outside of the geo-fence border for longer time duration (or even for an unlimited time) compared to if the user equipment 110 does not perform any active mode mobility measurements or does not have any active mode mobility capability. This example relates to who, i.e. the network node 130 or the user equipment 110 itself, has responsibility to ensure that the user equipment 110 is in the correct area, i.e. within the geo-fence. Normally the network node 130 delegates this responsibility to the user equipment 110 and the user equipment 110 needs to perform active mode mobility measurements in order to handle the responsibility. However, if the network node 130 has the responsibility then the mobility-decision may be less accurate and then the network node 130, e.g. the source radio network node 120, may decide to kick out the user equipment 110 using a smaller area, i.e. earlier in case the user equipment 110 is moving towards the geo-fence.

Figure 3:
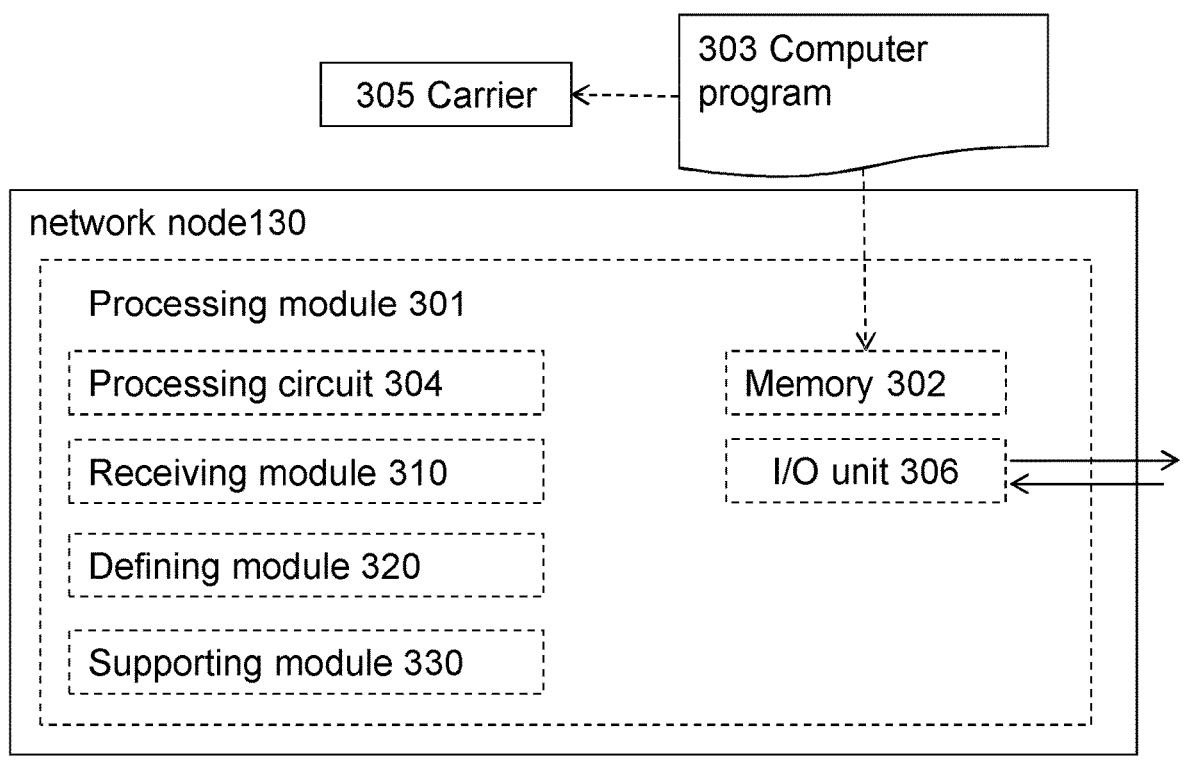
FIG. 3 is a block diagram illustrating embodiments of the network node.

With reference to FIG. 3, a schematic block diagram of embodiments of the network node 130 of FIG. 1 is shown.

The network node 130 may comprise a processing module 301, such as a means for, one or more hardware modules and/or one or more software modules for performing the methods described herein.

The network node 130 may further comprise a memory 302. The memory may comprise, such as contain or store, a computer program 303.

According to some embodiments herein, the processing module 301 comprises, e.g. 'is embodied in the form of' or 'realized by', a processing circuit 304 as an exemplifying hardware module. In these embodiments, the memory 302 may comprise the computer program 303, comprising computer readable code units executable by the processing circuit 304, whereby the network node 130 is operative to perform the methods of FIG. 2.

In some other embodiments, the computer readable code units may cause the network node 130 to perform the method according to FIG. 2 when the computer readable code units are executed by the network node 130.

FIG. 3 further illustrates a carrier 305, or program carrier, which comprises the computer program 303 as described directly above.

In some embodiments, the processing module 301 comprises an Input/Output unit 306, which may be exemplified by a receiving module and/or a sending module as described below when applicable.

In further embodiments, the processing module 301 may comprise one or more of a receiving module 310, a defining module 320, and a supporting module 330 as exemplifying hardware modules. In other examples, one or more of the aforementioned exemplifying hardware modules may be implemented as one or more software modules.

Accordingly, the network node 130 is configured for managing a geo-fence for use by a source radio network node 120.

Therefore, according to the various embodiments described above, the network node 130, the processing module 301 and/or the receiving module 310 is configured for receiving indications about signal quality at respective positions of user equipments 110, wherein the user equipments 110 have been subject to hand-overs from the source radio network node 120 at the respective positions, wherein the hand-overs are based on signal quality measured for the user equipments 110.

Moreover, the network node 130, the processing module 301 and/or the defining module 320 is configured for defining the geo-fence based on the respective positions and the indications about signal quality, wherein the geo-fence defines a geographical area.

Furthermore, the network node 130, the processing module 301 and/or the supporting module 330 is configured for supporting a hand-over of a user equipment from the source radio network node 120 to a target radio network node 121 while using the geo-fence, wherein the hand-over is performed without measurements, by the user equipment 110, of signal quality towards the target radio network node 121 for the user equipment 110.

The network node 130, the processing module 301 and/or the receiving module 310 may be configured for receiving, from a core network node for handling of operations and maintenance, a message relating to the indications, wherein the indications are obtained from drive-test measurements.

The network node 130, the processing module 301 and/or the receiving module 310 may be configured for receiving, from the source radio network node 120, a set of reports relating to the indications.

The indications may relate to measurements of uplink transmission from the user equipments at the respective positions for the hand-overs.

The indications may relate to measurements, performed by the user equipments 110, of downlink transmission from the source radio network node 120 at the respective positions for the hand-overs.

The indications may be received from the source radio network node 120, the user equipments 110 or a core network node.

The signal quality measurements for the handovers may include information about one or more of timing alignment and angle-of-arrival.

The network node 130 may comprise the source radio network node 120.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "unit" may refer to one or more functional units, each of which may be implemented as one or more hardware modules and/or one or more software modules in a node.

As used herein, the term "carrier", or "program carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a network node for managing a geo-fence for use by a source radio network node, wherein the method comprises:
   receiving indications about signal quality at respective positions of user equipments, wherein the user equipments have been subject to hand-overs from the source radio network node at the respective positions, wherein the hand-overs are based on signal quality measured for the user equipments;
   defining the geo-fence based on the respective positions and the indications about signal quality, wherein the geo-fence defines a geographical area, and wherein the geographical area is defined in terms of a set of signal quality fingerprints each of which comprises information indicating at least: a timing alignment, an angle-of-arrival, or an antenna pre-coder parameter, wherein each fingerprint comprises information indicating at least an antenna pre-coder parameter; and
   supporting a hand-over of a user equipment from the source radio network node to a target radio network node while using the geo-fence, wherein the hand-over is performed without measurements, by the user equipment, of signal quality towards the target radio network node for the user equipment.

2. The method of claim 1, wherein the receiving of indications about signal quality comprises:
   receiving, from a core network node for handling of operations and maintenance, a message relating to the indications, wherein the indications are obtained from drive-test measurements.

3. The method of claim 1, wherein the receiving of indications about signal quality comprises:

receiving, from the source radio network node, a set of reports relating to the indications.

4. The method of claim 3, wherein the indications relate to measurements of uplink transmission from the user equipments at the respective positions for the hand-overs.

5. The method of claim 3, wherein the indications relate to measurements, performed by the user equipments, of downlink transmission from the source radio network node at the respective positions for the hand-overs.

6. The method of claim 1, wherein the indications are received from the source radio network node, the user equipments or a core network node.

7. The method of claim 1, wherein the network node comprises the source radio network node.

8. The method of claim 1, wherein each fingerprint comprises information indicating at least: a timing alignment and a corresponding angle-of-arrival.

9. A network node configured for managing a geo-fence for use by a source radio network node, wherein the network node is configured to:
receive indications about signal quality at respective positions of user equipments, wherein the user equipments have been subject to hand-overs from the source radio network node at the respective positions, wherein the hand-overs are based on signal quality measured for the user equipments;
define the geo-fence based on the respective positions and the indications about signal quality, wherein the geo-fence defines a geographical area, and wherein the geographical area is defined in terms of signal quality fingerprints each of which comprises information indicating at least: a timing alignment, an angle-of-arrival, or an antenna pre-coder parameter, wherein each fingerprint comprises information indicating at least an antenna pre-coder parameter; and
support a hand-over of a user equipment from the source radio network node to a target radio network node while using the geo-fence, wherein the hand-over is performed without measurements, by the user equipment, of signal quality towards the target radio network node for the user equipment.

10. The network node of claim 9, wherein the network node is configured to receive, from a core network node for handling of operations and maintenance, a message relating to the indications, wherein the indications are obtained from drive-test measurements.

11. The network node of claim 9, wherein the network node is configured to receive, from the source radio network node a set of reports relating to the indications.

12. The network node of claim 11, wherein the indications relate to measurements of uplink transmission from the user equipments at the respective positions for the hand-overs.

13. The network node of claim 11, wherein the indications relate to measurements, performed by the user equipments, of downlink transmission from the source radio network node at the respective positions for the hand-overs.

14. The network node of claim 9, wherein the indications are received from the source radio network node, the user equipments or a core network node.

15. The network node of claim 9, wherein the network node comprises the source radio network node.

16. A computer program product comprising a non-transitory computer readable medium storing code units which when executed on a radio network node device causes the radio network node to perform the method of claim 1.

* * * * *